(12) United States Patent
Katashiba

(10) Patent No.: US 9,110,287 B2
(45) Date of Patent: Aug. 18, 2015

(54) CATADIOPTRIC SYSTEM AND IMAGE PICKUP APPARATUS

(75) Inventor: Yuji Katashiba, Utsunomiya (JP)

(73) Assignee: CANON KABUSHIKI KAISHA (JP)

( * ) Notice: Subject to any disclaimer, the term of this patent is extended or adjusted under 35 U.S.C. 154(b) by 340 days.

(21) Appl. No.: 13/566,395

(22) Filed: Aug. 3, 2012

(65) Prior Publication Data

US 2013/0033635 A1 Feb. 7, 2013

(30) Foreign Application Priority Data

Aug. 5, 2011 (JP) .................................. 2011-171654

(51) Int. Cl.
G02B 17/00 (2006.01)
G02B 21/00 (2006.01)
G02B 23/00 (2006.01)
G02B 21/04 (2006.01)
G02B 17/08 (2006.01)

(52) U.S. Cl.
CPC ............ *G02B 21/04* (2013.01); *G02B 17/0808* (2013.01)

(58) Field of Classification Search
CPC ............................. G02B 21/04; G02B 17/0808
USPC ................. 359/364–366, 726–736, 753, 754; 348/335, E5.024
See application file for complete search history.

(56) References Cited

U.S. PATENT DOCUMENTS

| | | | |
|---|---|---|---|
| 5,691,802 A * | 11/1997 | Takahashi ........................ | 355/53 |
| 6,195,213 B1 * | 2/2001 | Omura et al. .................. | 359/727 |
| 7,929,114 B2 | 4/2011 | Mann | |
| 2004/0165257 A1 * | 8/2004 | Shafer et al. .................. | 359/366 |

FOREIGN PATENT DOCUMENTS

| | | |
|---|---|---|
| JP | 53-112759 | 10/1978 |
| JP | 2002082285 A | 3/2002 |
| JP | 2007-514179 A | 5/2007 |
| JP | 2008177575 A | 7/2008 |
| JP | 2009-063655 A | 3/2009 |
| WO | 00/39623 A1 | 7/2000 |
| WO | 2005/022204 A2 | 3/2005 |

OTHER PUBLICATIONS

Japanese Office Action cited in Japanese counterpart application No. JP2011-171654, dated Apr. 28, 2015.

* cited by examiner

*Primary Examiner* — Ricky Mack
*Assistant Examiner* — Mustak Choudhury
(74) *Attorney, Agent, or Firm* — Rossi, Kimms & McDowell LLP

(57) ABSTRACT

The catadioptric system includes a first imaging optical system collecting light from an object and a second imaging optical system causing the light from the first imaging optical system to form an intermediate image and to cause the light from the intermediate image to form an optical image. The first imaging optical system includes a first optical element including a first light transmissive portion and a first back reflective portion, and a second optical element including a second light transmissive portion and a second back reflective portion. The first light transmissive portion, the second back reflective portion, the first back reflective portion and the second light transmissive portion introduce the light from the object to the second imaging optical system. The second imaging optical system includes an aspheric lens having a negative refractive power on and around the optical axis and a positive refractive index in its peripheral portion.

9 Claims, 5 Drawing Sheets

CATADIOPTRIC SYSTEM AND IMAGE PICKUP APPARATUS

BACKGROUND OF THE INVENTION

1. Field of the Invention

The present invention relates to a catadioptric system suitable for observing an enlarged optical image of an object, and to an image pickup apparatus including the catadioptric system.

2. Description of the Related Art

Conventional pathology inspections use an optical microscope through which a pathology specimen (sample) is observed directly by person's eyes. On the other hand, recent pathology inspections use a virtual microscope capturing image data of the pathology specimen to allow observation of the image data displayed on a monitor. Such a virtual microscope enables plural persons to simultaneously observe the image data of the pathology specimen displayed on the monitor. Moreover, the use of the virtual microscope provides many advantages such as asking a distant pathologist for diagnosis using shared image data. However, the use of the virtual microscope has a problem that acquisition of the image data of the pathology specimen through image capturing requires a long time.

One of reasons for requiring such a long time is necessity to acquire the image data of the pathology specimen having a wide area through a narrow image capturing field. Such a narrow image capturing field makes it necessary to produce one large image by joining images acquired by plural image capturing operations with scanning. Therefore, in order to reduce number of times of the image capturing operations to shorten the time required for acquiring the image data, an optical system (image capturing optical system) providing a wide image capturing field is required.

Besides such an optical system providing the wide image capturing area for observation of the pathology specimen, an optical system having high resolution in a visible wavelength range (that is, in a wide wavelength range) is desired. Thus, Japanese Published Examined Patent Application No. 60-034737 discloses a microscope objective lens constituted by a refractive optical system and having well-reduced aberrations in an entire visible wavelength range, which is suitable for observation of specimens such as biological cells.

Moreover, Japanese Patent Laid-Open No. 2007-514179 discloses a super-wideband ultraviolet microscope system using a catadioptric imaging system and having high resolving power over a wide wavelength range, which is used for inspecting defects existing in integrated circuits and photomasks. Furthermore, WIPO Patent Application WO00/039623 discloses a catadioptric imaging system suitable for exposing minute patterns to a wide area to manufacture semiconductor devices. In addition, Japanese Patent Laid-Open No. 2009-063655 discloses a microscope system that efficiently acquires wide-screen digital image data to be used for observation of pathology specimens such as biological cells.

Image capturing optical systems for the virtual microscopes are generally required to have high optical performance in a wide field of view, which is achieved by good correction of various aberrations such as spherical aberration, comatic aberration and astigmatism.

On the other hand, suppression of negative influences (such as distortion) caused by positional errors of the pathology specimen and an image sensor requires that the image capturing optical system have telecentricity on both object and image sides. In particular, wide-screen image capturing requires good telecentricity over an entire observation field of view. Moreover, RGB (red, green and blue) color image capturing for acquiring a color image requires good telecentricity over an entire image capturing wavelength range.

The microscope objective lens disclosed in Japanese Published Examined Patent Application No. 60-034737 sufficiently reduces various aberrations over the entire visible wavelength range, but does not necessarily provide an observation field of view having a sufficient size. Also, the wideband microscope catadioptric imaging system disclosed in Japanese Patent Laid-Open No. 2007-514179 sufficiently reduces aberrations over a wide wavelength range and has high resolving power, but does not necessarily provide an observation field of view having a sufficient size.

Furthermore, the catadioptric imaging system disclosed in WIPO Patent Application WO00/039623 has high resolving power over a wide wavelength range, but does not necessarily corrects aberrations in a sufficiently wide wavelength range.

Additionally, the microscope system disclosed in Japanese Patent Laid-Open No. 2009-063655 performs image capturing by using plural image sensors arranged in an image capturing field of an objective lens and efficiently acquires wide-screen image data by joining data of captured images. The microscope system provides overlapping portions to the respective captured image data to enable accurate joining of mutually adjacent captured image data.

However, if the objective lens in the microscope system has low telecentricity on its image side, displacement of positions of the image sensors in a direction of an optical axis due to manufacturing errors or focus adjustment generates distortion. Larger distortion causes a necessity of providing wider overlapping portions for joining the mutually adjacent captured image data. Moreover, when performing image capturing for each of RGB to acquire a color image, it is necessary to provide sufficient overlapping portions so as to also enable joining of captured image data of an image capturing wavelength at which the image side telecentricity becomes lowest.

In such a case, number of pixels to be used only as the overlapping portions for joining of the image data is increased with respect to the wide-screen image data to be acquired, which increases volume of data and thereby makes it difficult to acquire the wide-screen image data at high speed.

In order to provide a wide observation field of view and high optical performance over a wide wavelength range for observing an enlarged image of a specimen, use of an optical surface having an aspheric shape is effective.

However, even if simply using such an aspheric optical surface, it is difficult to correct various aberrations well over a wide wavelength range and to achieve high optical performance over a wide observation field of view.

In particular, in order to realize a catadioptric system having good image side telecentricity in the wide wavelength range and in the wide observation field of view by using an aspheric optical surface, it is important to provide an optical surface having an appropriate aspheric shape to an appropriate position in the catadioptric system.

SUMMARY OF THE INVENTION

The present invention provides a catadioptric system using an aspheric surface and having good image side telecentricity and high optical performance in a wide wavelength range and in a wide observation field of view.

The present invention provides as one aspect thereof a catadioptric system that includes a first imaging optical system including a catadioptric part to collect a light flux from an object, and a second imaging optical system including a refractive part to cause the light flux from the first imaging optical system to form an intermediate image and to cause the light flux from the intermediate image to form an optical image on an image surface. The first imaging optical system includes a first optical element including a first light transmissive portion formed on and around an optical axis and a first back reflective portion formed as an object side surface in a more outer peripheral side portion than the first light transmissive portion, and a second optical element including a second light transmissive portion formed on and around the optical axis and a second back reflective portion formed as an image side surface in a more outer peripheral side portion than the second light transmissive portion, the first and second back reflective portions being arranged such that their reflective surfaces face toward each other. The first light transmissive portion of the first optical element, the second back reflective portion of the second optical element, the first back reflective portion of the first optical element and the second light transmissive portion of the second optical element introduce the light flux from the object in this order to the second imaging optical system. The second imaging optical system includes an aspheric lens having a negative refractive power on and around the optical axis and a positive refractive index in its peripheral portion.

The present invention provides as another aspect thereof an image pickup apparatus including a light source, an illumination optical system to illuminate the object with a light flux from the light source, the above catadioptric system to cause the light flux from the object to form the optical image of the object, and an image sensor to photoelectrically convert the optical image formed by the catadioptric system.

Other aspects of the present invention will be apparent from the embodiments described below with reference to the drawings.

DESCRIPTION OF THE PREFERRED EMBODIMENTS

Exemplary embodiments of the present invention will be described below with reference to the accompanied drawings.

Figure 1:
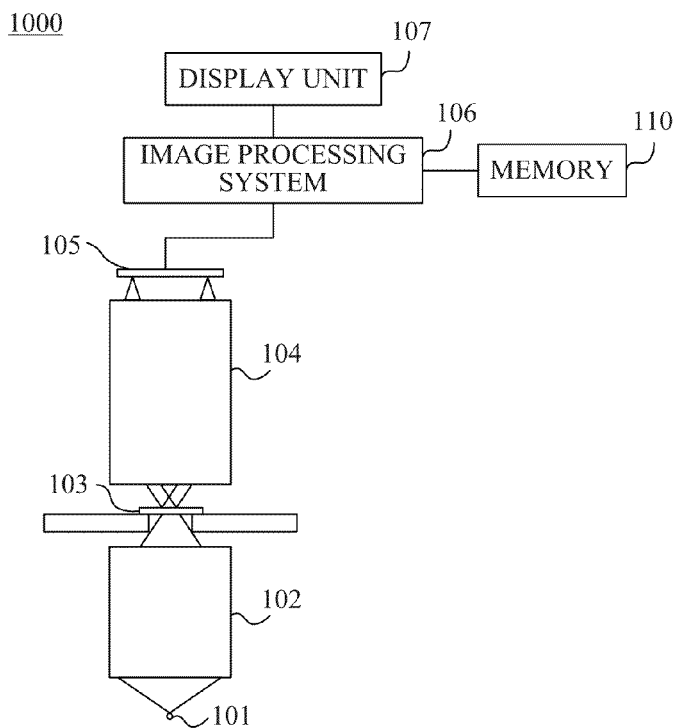
FIG. 1 is a block diagram showing a configuration of an image pickup apparatus that is a basic embodiment of the present invention.

FIG. 1 shows a configuration of an image pickup apparatus 100 that is a basic embodiment of the present invention. The image pickup apparatus 1000 includes a light source 101, an illumination optical system 102 to illuminate an object 103 with a light flux from the light source 101, and a catadioptric system 104 to cause the light flux to form an optical image of the object 103. The optical image of the object 103 is hereinafter referred to as "an object image". The image pickup apparatus 1000 further includes an image sensor (image pickup element) 105 to photoelectrically convert the object image formed by the catadioptric system 104, an image processing system 106 to produce image information (image data) by using data from the image sensor 105, a display unit 107 to display the image data produced by the image processing system 106, and a memory 110 to store the image data produced (and processed) by the image processing system 106.

The catadioptric system 104 in this embodiment is constituted by a first imaging optical system G1 including a catadioptric part to collect the light flux from the object 103, and a second imaging optical system G2 including a refractive part to cause the light flux from the first imaging optical system G1 to form an intermediate image IM and to cause the light flux from the intermediate image IM to form an optical image thereof on an image surface.

The catadioptric system 104 forms an image capturing field (observation field of view) having a diameter of 3 mm or more on a surface of the object 103 (hereinafter referred to as "an object surface").

In the image pickup apparatus 1000, the illumination optical system 102 collects the light flux from the light source 101 to illuminate the object 103 as a specimen (sample) evenly with the collected light flux. The light source 101 emits visible light whose wavelength range is, for example, 400 nm to 700 nm. An imaging optical system of the image pickup apparatus 1000 is constituted by the catadioptric system 104 including the catadioptric part and refractive part which form the object image on the image sensor 105 placed on an image surface of the imaging optical system (catadioptric system 104).

The image processing system 106 produces the image data (image information) from the data from the image sensor 105, displays the produced image data on the display unit 107, and stores the produced image data to the memory 110. The image processing system 106 performs various processes such as correction of aberrations that cannot be corrected by the catadioptric system 104 and production of one combined image (image data) by joining plural images captured at mutually different image capturing positions. Plural image sensors may be disposed on the image surface of the catadioptric system 104 for performing image capturing at mutually different image capturing positions.

Figure 2:
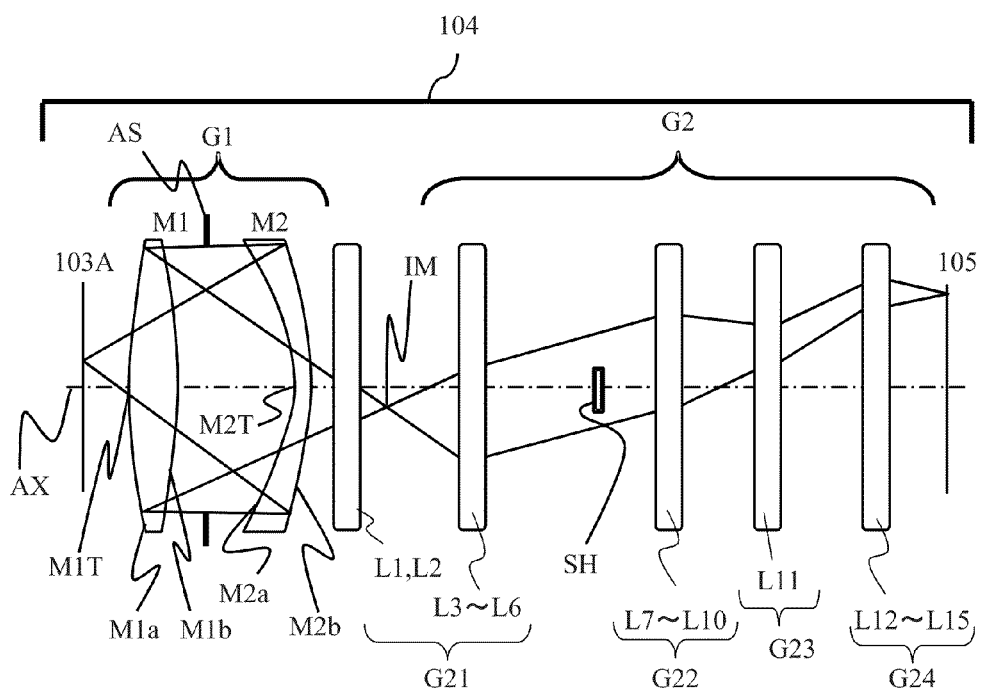
FIG. 2 shows a configuration of a catadioptric system in the image pickup apparatus of the basic embodiment.
Figure 3:
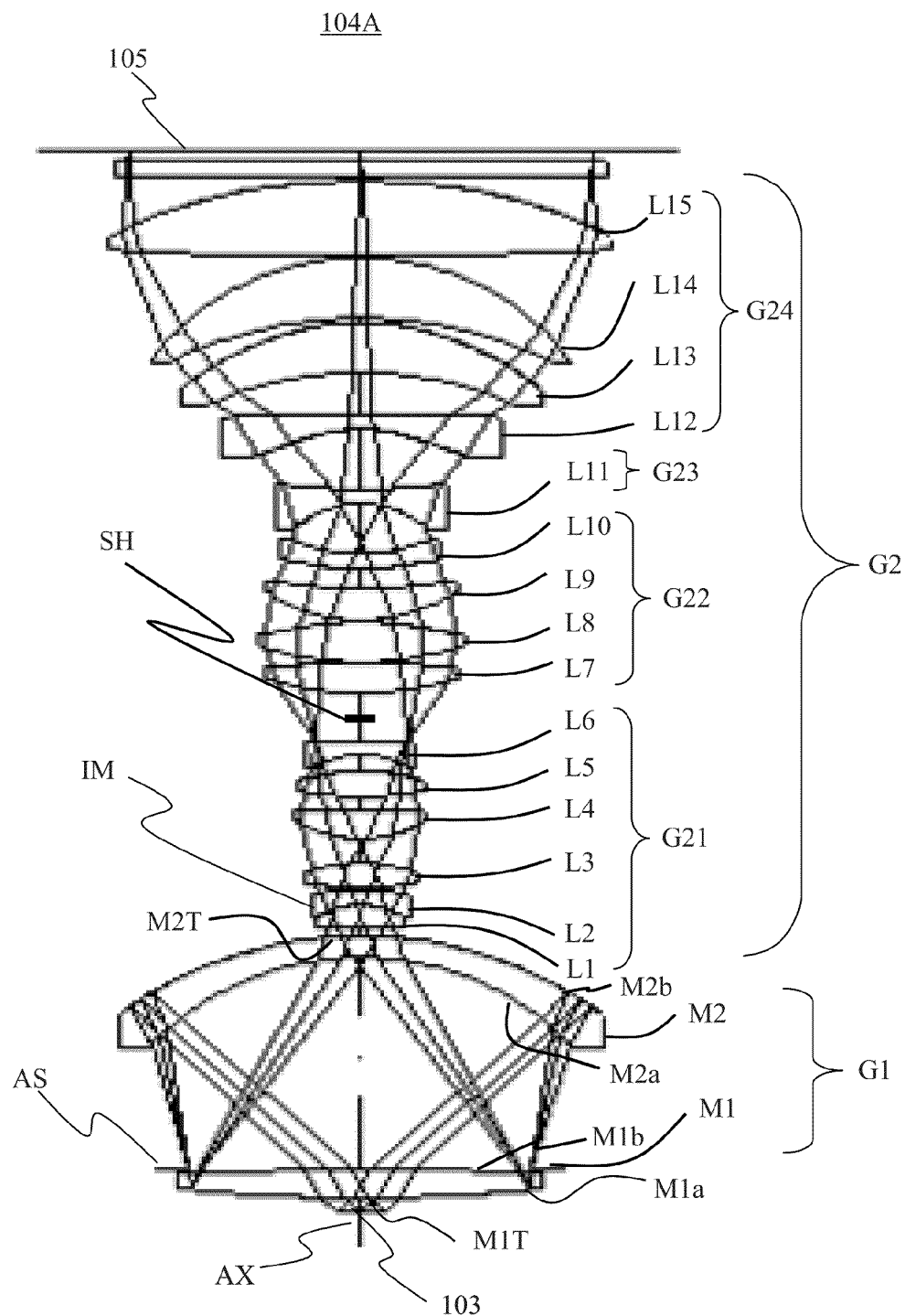
FIG. 3 shows a configuration of a catadioptric system of Embodiment 1 (Numerical Example 1) of the present invention.
Figure 6:
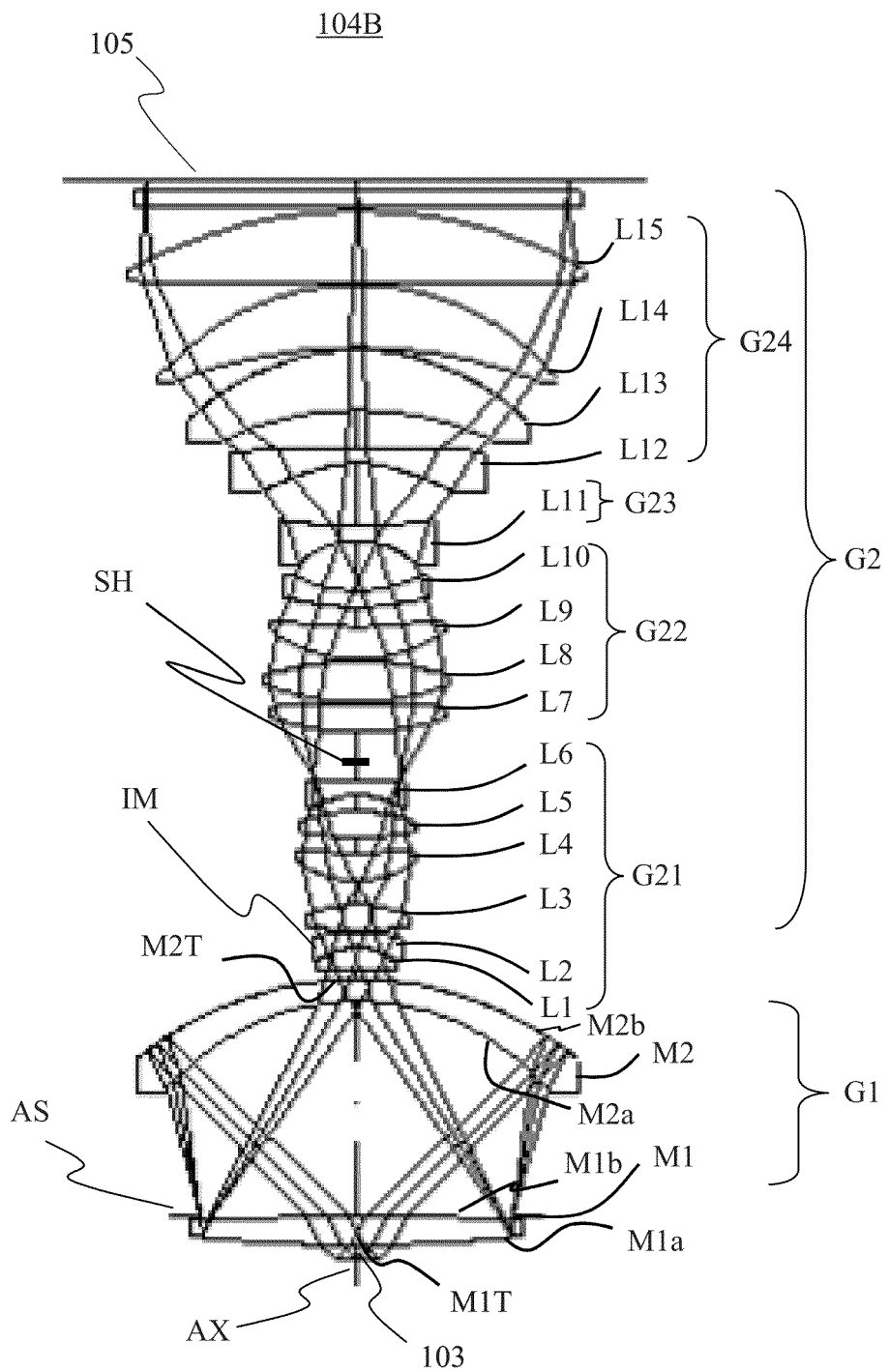
FIG. 6 shows a configuration of a catadioptric system of Embodiment 2 (Numerical Example 2) of the present invention.

Next, a detailed description will be made of the catadioptric system 104 with reference to FIGS. 2, 3 and 6. FIG. 2 shows a configuration of the catadioptric system 104 in the basic embodiment. FIGS. 3 and 6 show configurations of catadioptric systems that are specific embodiments (Embodiments 1 and 2).

In FIGS. 2, 3 and 6, reference numeral 103A denotes the above-mentioned object surface, reference character AS denotes an aperture stop, and reference character IM denotes the above-mentioned intermediate image. Reference character AX denotes an optical axis of the catadioptric system 104. In the catadioptric system 104, the first imaging optical system G1 collects, by its catadioptric part including reflective surfaces, the light flux from the object surface 103A. Moreover, the second imaging optical system G2 causes, by its refractive part, the light flux from the first imaging optical system G1 to form the intermediate image IM on a predetermined intermediate image surface and causes the light flux from the intermediate image IM to form the optical image thereof on the image sensor 105. The second imaging optical system G2 includes a light shield SH.

The first imaging optical system G1 includes, in order from an object side toward an image side, a first optical element (Mangin mirror) M1, the above-mentioned aperture stop AS and a second optical element (Mangin mirror) M2.

The second imaging optical system G2 includes, in order from the object side toward the image side, a first lens group G21, a second lens group G22, a third lens group G23 and a fourth lens group G24. The four lens groups G21 to G24 are separated with a first-widest aerial distance, a second-widest aerial distance and a third-widest aerial distance thereamong. In FIG. 2, an aerial distance between the first and second lens groups G21 and G22 is the first-widest aerial distance, an aerial distance between the third and fourth lens groups G23 and G24 is the second-widest aerial distance, and an aerial distance between the second and third lens groups G22 and G23 is the third-widest aerial distance. However, this relationship of the aerial distances is merely an example, and other relationships of the aerial distances may be set. A light shielding plate constituting the light shield SH is disposed between the first and second lens groups G21 and G22.

FIGS. 3 and 6 schematically show off-axis light fluxes from the object surface 103A to the image sensor (image surface) 105.

The first optical element M1 of the first imaging optical system G1 has a convex object side surface, and includes a first light transmissive portion M1T formed on and around the optical axis (in other words, in a central portion) and having a positive refractive power. The first optical element M1 further includes a first back reflective portion where a reflective film is formed on an object side surface M1a in a more outer peripheral side portion than the first light transmissive portion M1T. The first optical element M1 further has a refractive surface M1b as an image side surface.

The second optical element M2 of the first imaging optical system G1 has a meniscus shape including a concave object side surface, and includes a second light transmissive portion M2T formed on and around the optical axis (in other words, in a central portion) and having a negative optical power. The second optical element M2 further includes a second back reflective portion where a reflective film is formed on an image side surface M2b in a more outer peripheral portion than the second light transmissive portion M2T. The first and second back reflective portions M1a and M2b of the first and second optical elements M1 and M2 are arranged such that their reflective surfaces face toward each other. The second optical element M2 further has a refractive surface M2a as an object side surface.

The light shielding plate SH disposed between the first and second lens groups G21 and G22 in the second imaging optical system G2 shields a partial light flux on and around the optical axis in the light flux from the object surface 103A to prevent the partial light flux from entering into the image sensor 105.

The object 103 is illuminated with the light flux from the illumination optical system 102. In the catadioptric system 104, the light flux exiting from the object 103 passes through the first transmissive portion M1T as the central portion of the first optical element M1, enters the second optical element M2 through the refractive surface M2a thereof, is reflected by the second back reflective portion M2b, passes through the refractive surface M2a and then enters the first optical element M1 through the refractive surface M1b. Thereafter, the light flux is reflected by the first back reflective portion M1a of the first optical element M1, passes through the refractive surface M1b thereof, and then passes through the second transmissive portion M2T as the central portion of the second optical element M2 to exit therefrom toward the second imaging optical system G2.

Each of the first and second back reflective portions M1a and M2b of the first and second optical elements M1 and M2 included in the first imaging optical system G1 is formed to have an aspheric shape. These aspheric back reflective portions M1a and M2b correct spherical aberration and comatic aberration well while suppressing generation of chromatic aberration, and sufficiently reduce various aberrations over a wide visible wavelength range even when having a high NA (in other words, a large aperture ratio).

Moreover, each of the first and second back reflective portions M1a and M2b of the first and second optical elements M1 and M2 is formed as a reflective surface having a positive optical power. These reflective surfaces suppress increase of Petzval sum when an entire length of the catadioptric system 104 is shortened by increasing positive refractive powers of lenses included in the second imaging optical system G2. This is because effects of reflective and refractive surfaces on the Petzval sum are opposite to each other.

The second imaging optical system G2 causes the light flux entering from the first imaging optical system G1 to form the intermediate image IM. The light flux from the intermediate image IM passes through the first lens group G21 (lenses L1 to L6) having a positive refractive power, the second lens group G22 (lenses L7 to L10) having a positive refractive power, the third lens group G23 (lens L11) having a negative refractive power and the fourth lens group G24 (lenses L12 to L15) having a positive refractive power, in this order. Then, the light flux forms an enlarged image of the object 103 on the image sensor 105.

In addition, the above-mentioned light shading plate SH prevents the light flux from the object 103 from passing through the central transmissive portions M1T and M2T of the first and second optical elements M1 and M2 to reach the image sensor 105 directly without being reflected by the first and second optical elements M1 and M2.

The catadioptric system 104 of each embodiment is constituted such that the second imaging optical system G2 includes at least one aspheric lens surface having an inflexion point at which the direction of its curvature changes in its optically effective diameter.

Moreover, each embodiment provides a negative refractive power to a portion on and around the optical axis (central portion) in the aspheric lens surface and provides a positive refractive power to a peripheral portion therein.

Such an aspheric lens surface having the refractive powers provides, to the catadioptric system 104, image side telecentricity so as to make principal rays of the light flux entering the image sensor 105 parallel or approximately parallel to the optical axis AX.

The image side telecentricity enables suppression of distortion generated when position of the image sensor 105 is displaced in the optical axis direction due to manufacturing errors or focus adjustment. The suppression of the distortion caused by the positional displacement of the image sensor 105 enables easy production of wide-screen image data by arranging plural image sensors 105 in the image capturing field and by joining plural image data captured by the plural image sensors 105. In addition, the suppression of the distortion enables reduction of areas of overlapping portions provided in each of the image data for joining of the image data mutually adjacent, which makes it possible to reduce volume of data and thereby makes it easy to produce the wide-screen image data with high speed.

Furthermore, each embodiment satisfies the following condition:

$$70 < \nu da$$

where νda represents an Abbe number of a material of at least one lens having the above-mentioned aspheric lens surface.

The satisfaction of the above condition enables provision of good telecentricity in a wide visible wavelength range.

For example, the catadioptric system 104 of each embodiment has telecentricity for light of wavelengths of a C-line (656.3 nm), a d-line (587.6 nm), an F-line (486.1 nm) and a g-line (435.8 nm) in Fraunhofer lines. For example, the catadioptric system 104 of each embodiment causes principal rays to enter the image sensor (image surface) 105 at an incident angle of 1.25° or less in the entire image capturing field.

Such telecentricity enables suppression of the distortion to 22 μm or less when the position of the image sensor 105 is displaced by 1 mm in the optical axis direction due to the focus adjustment or the like. The suppressed distortion amount falls, for example, within ten pixels even when an image sensor having a pixel pitch of 2.2 μm is used. On the contrary, an incident angle of the principal ray exceeding 1.25° increases number of pixels needed as the overlapping portion, which increases volume of data to be treated in image processing and thereby undesirably makes it difficult to produce wide-screen image data with high speed.

In an optical system like the catadioptric system 104 of each embodiment in which a light shield (SH) is provided in a pupil of the optical system, principal rays are shielded by the light shield and thereby do not reach an image surface. However, even in such a case, the incident angle of the principal ray to the image surface can be defined. For example, the incident angle of the principal ray to the image surface may be defined as an average of incident angles of upper and lower marginal rays in a light flux entering the image surface, or may be calculated by using virtual principal rays defined by ray tracing using optical software.

As described above, in the second imaging optical system G2 in each embodiment, the aspheric lens surface has the inflexion point at which the direction of its curvature changes in its optically effective diameter, and has the negative refractive power in its central portion and the positive refractive power in its peripheral portion. The inflection point is set according to an image height characteristic of the incident angle of the principal ray to the image sensor (image surface) 105.

Each embodiment suppresses the incident angle of the principle ray in the entire image capturing field by setting the inflexion point according to the image height characteristic near an incident angle of 0°.

Furthermore, it is desirable that the aspheric surface having the inflexion point in each embodiment satisfy the following condition:

$$0.09 < D/Y\text{max} < 1.01 \tag{1}$$

where D represents a distance of an outermost off-axis principal ray from the optical axis on the aspheric surface, and Ymax represents a maximum image height.

The use of such an aspheric surface having the inflexion point as the lens surface on which light fluxes of respective image heights impinges at mutually different positions facilitates provision of good telecentricity in the entire image capturing field. A lower value of D/Ymax than the lower limit of the condition (1) increases an influence of the aspheric surface on a uniform image height component of a wavefront further than an influence thereof on the image height characteristic, which increases wavefront aberration and thereby makes it difficult to provide good telecentricity. On the other hand, a higher value of D/Ymax than the upper limit of the condition (1) means disposing of an aspheric surface whose effective diameter is larger than the image surface (image sensor 105) in an optical path of the catadioptric system 104, which undesirably increases size of the catadioptric system 104.

As described above, in the optical system in which the light shield is provided in the pupil of the optical system, the principal rays are shielded by the light shield and thereby do not reach the image surface. However, even in such a case, the distance D of the outermost off-axis principal ray from the optical axis on the aspheric surface can be defined. For example, the distance D may be defined as an average of incident angles of upper and lower marginal rays in an outermost off-axis light flux on the aspheric surface having the inflexion point, or may be calculated by using virtual principal rays defined by ray tracing using optical software.

The use of such an aspheric lens surface enables provision of a catadioptric system that corrects wavefront aberration well and has good image side telecentricity in a wide wavelength range and in the entire wide image capturing field.

Although the above-described configuration in each embodiment can provide the catadioptric system having and maintaining high optical performance in a wide image capturing field, it is more desirable that the catadioptric system satisfy at least one of the following conditions (2) to (8).

In the following conditions, f1 represents a focal length of the first imaging optical system G1, and f2 represents a focal length of the second imaging optical system G2. Moreover, β1 represents an imaging magnification of the first imaging optical system G1, and β2 represents an imaging magnification of the second imaging optical system G2. Furthermore, in the second imaging optical system G2, f21 represents a focal length of the first lens group G21, f22 represents a focal length of the second lens group G22, f23 represents a focal length of the third lens group G23, and f24 represents a focal length of the fourth lens group G24.

$$0.00 \leq |f1/f2| < 0.25 \tag{2}$$

$$1.3 < |\beta 1| < 1.7 \tag{3}$$

$$6.2 < |\beta 2| < 6.9 \tag{4}$$

$$0.00 \leq |f21/f2| < 0.10 \tag{5}$$

$$0.00 \leq |f22/f2| < 0.12 \tag{6}$$

$$0.00 \leq |f23/f2| < 0.13 \tag{7}$$

$$0.00 \leq |f24/f2| < 0.50 \tag{8}$$

Satisfying the condition (2) relating to a ratio of the focal lengths of the first and second imaging optical systems G1 and G2 enables correction of various aberrations with a good balance.

An optical power (inverse of the focal length) of the first imaging optical system G1 which is too weak compared with that of the second imaging optical system G2 so as to make a value of |f1/f2| higher than the upper limit of the condition (2) makes it difficult to reduce Petzval sum and chromatic aberration of the entire optical system with a good balance.

The lower limit 0.00 of the condition (2) is provided for a case where the second imaging optical system G2 is an afocal optical system whose focal length f2 is infinite.

Satisfying the conditions (3) and (4) relating to the imaging magnifications of the first and second imaging optical systems G1 and G2 mainly enables sharing of a high imaging magnification of the catadioptric system 104 between the first and second imaging optical systems G1 and G2 with a good balance.

Satisfying the conditions (5) to (8) enables setting of proper refractive powers (inverses of the focal lengths) of the four lens groups G21 to G24 which are separated with the first-widest aerial distance, the second-widest aerial distance and the third-widest aerial distance thereamong in the second imaging optical system G2.

The setting of the proper refractive powers of the four lens groups G21 to G24 enables formation of the intermediate image IM with the light flux from the first imaging optical system G1 and facilitates imaging of the light flux from the intermediate image IM on the image surface with high optical performance.

The condition (5) relates to the refractive power of the first lens group G21 (lenses L1 to L6). The condition (6) relates to the refractive power of the second lens group G22 (lenses L7 to L10). The condition (7) relates to the refractive power of the third lens group G23 (lens L11), and the condition (8) relates to the refractive power of the fourth lens group G24 (lenses L12 to L15).

Exceeding the numerical range of at least one of the conditions (5) to (8) makes it difficult to cause the second imaging optical system G2 to form the intermediate image IM with the light flux from the first imaging optical system G1 and to cause it to form the optical image of the light flux from the intermediate image IM on the image surface with high optical performance.

The lower limit 0.00 of each of the conditions (5) to (8) is provided for the case where the second imaging optical system G2 is the above-mentioned afocal optical system.

Description will hereinafter be made of lens configurations of catadioptric systems that are first and second embodiments (Embodiments 1 and 2) of the present invention as first and second numerical examples (Numerical Examples 1 and 2).

[Embodiment 1]

In the following description, a specimen (object) side surface of each lens is referred to "as an R1 surface", and an image sensor (image) side surface of each lens is referred to as "an R2 surface".

In Embodiment 1, the R2 surface of the lens L7 in the second lens group G22 is the aspheric surface including the inflexion point. The R2 surface of the lens L7 has a negative optical power on and around the optical axis AX and has a positive refractive power in its peripheral portion, which provides good telecentricity not on the object side, but also on the image side. The ratio of the distance D of the outermost off-axis principal ray from the optical axis AX on the R2 surface of the lens L7 to the maximum image height Ymax is as follows:

$$D/Y\text{max}=0.094.$$

Embodiment 1 thus employs the aspheric surface having the inflexion point as a lens surface on which light fluxes of respective image heights impinge at mutually different positions, thereby enabling provision of good telecentricity.

Embodiment 1 (Numerical Example 1) has an object side numerical aperture (NA) of 0.7 and an imaging magnification (β) of the entire system of 10 times. The image capturing field (observation field of view) has a diameter of 14.4 mm. An area ratio of a light-shielded portion by the light shield SH to the pupil is suppressed to 20 percent or less.

Figure 4:
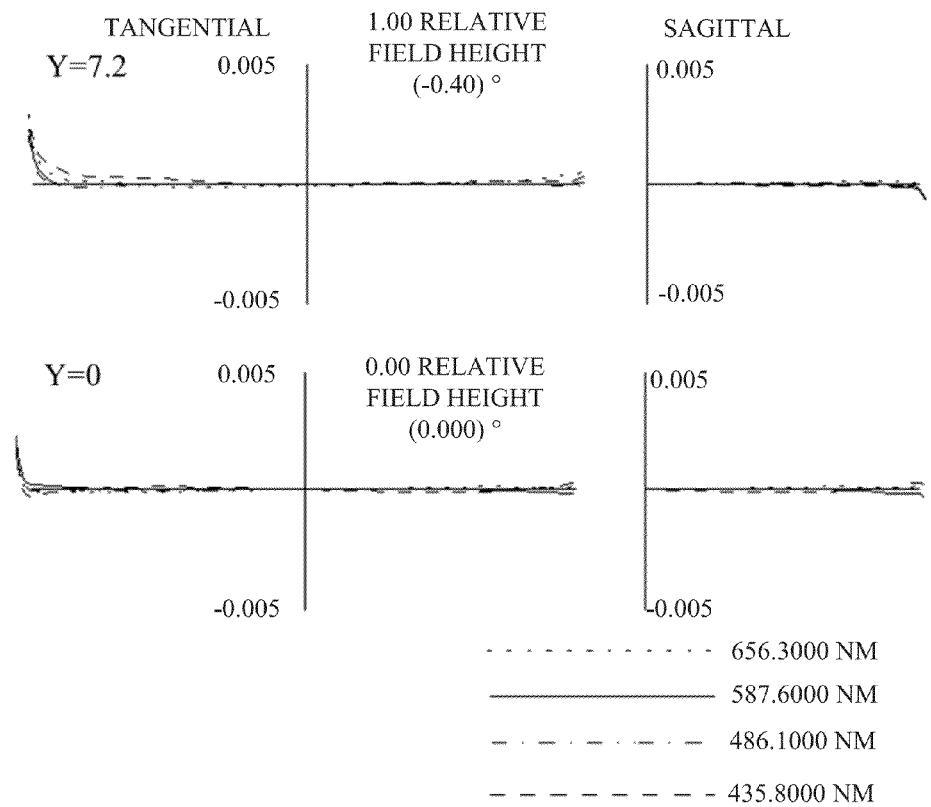
FIG. 4 shows lateral aberration charts of the catadioptric system of Embodiment 1.

FIG. 4 shows lateral aberrations of light of wavelengths of the C-line (656.3 nm), the d-line (587.6 nm), the F-line (486.1 nm) and the g-line (435.8 nm) at an axial object height (Y=0 mm) and a maximum object height (Y=7.2 mm). The aberrations are sufficiently suppressed.

Figure 5:
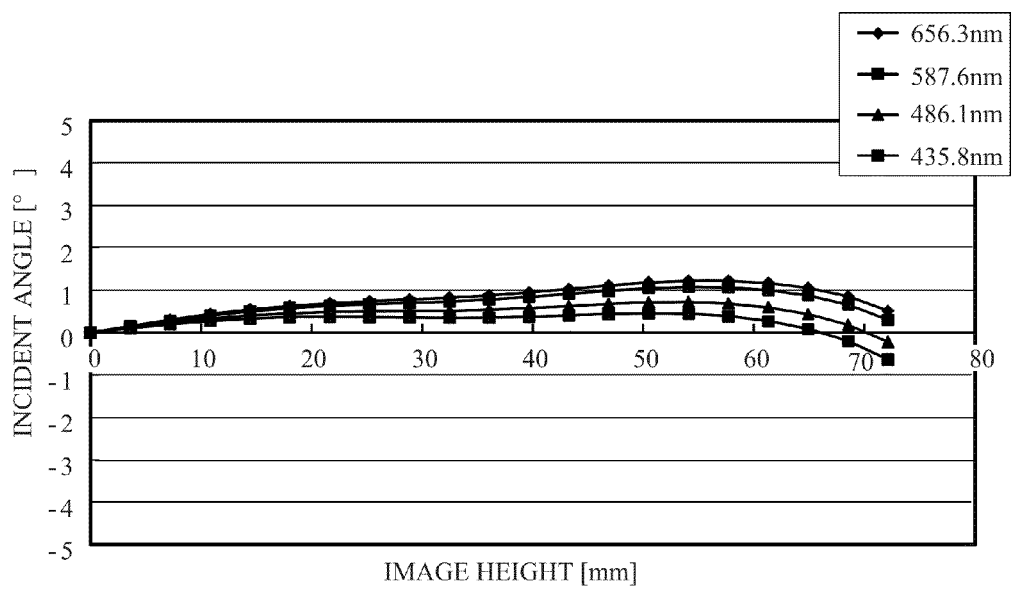
FIG. 5 shows incident angles of principal rays to respective image heights in the catadioptric system of Embodiment 1.

FIG. 5 shows incident angles of principal rays to respective image heights. The figure shows that the use of the aspheric surface having the inflexion point generates inflection points of the incident angles of the principal rays according to the image height. The incident angles of the principal rays of the C-line (656.3 nm), the d-line (587.6 nm), the F-line (486.1 nm) and the g-line (435.8 nm) to the respective image heights on the image surface (image sensor 105) are 1.25° or less.

[Embodiment 2]

In Embodiment 2, the R2 surface of the lens L7 in the second lens group G22 and the R1 surface of the lens L15 in the fourth lens group G24 are the aspheric surfaces each including the inflexion point. Embodiment 2 is different from Embodiment 1 in that two aspheric surfaces each including the inflexion point are included. Each of the R2 surface of the lens L7 and the R1 surface of the lens L15 has a negative optical power on and around the optical axis AX and has a positive refractive power in its peripheral portion, which provides good telecentricity not on the object side, but also on the image side.

The ratio of the distance D (D1) of the outermost off-axis principal ray from the optical axis AX on the R2 surface of the lens L7 to the maximum image height Ymax is as follows:

$$D1/Y\text{max}=0.091.$$

And, the ratio of the distance D (D2) of the outermost off-axis principal ray from the optical axis AX on the R1 surface of the lens L15 to the maximum image height Ymax is as follows:

$$D2/Y\text{max}=0.983.$$

Embodiment 2 thus employs the aspheric surfaces each having the inflexion point as lens surfaces on which light fluxes of respective image heights impinge at mutually different positions, thereby enabling provision of good telecentricity.

Embodiment 2 (Numerical Example 2) has an object side numerical aperture (NA) of 0.7 and an imaging magnification (β) of the entire system of 10 times. The image capturing field (observation field of view) has a diameter of 14.4 mm. An area ratio of a light-shielded portion by the light shield SH to the pupil is suppressed to 20 percent or less.

Figure 7:
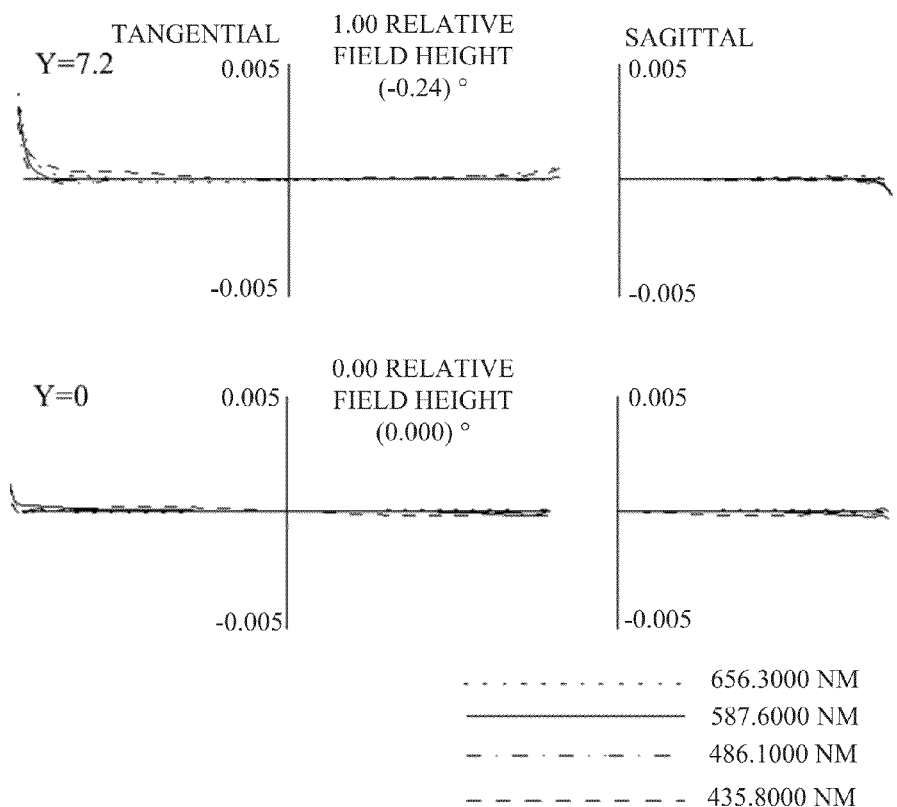
FIG. 7 shows lateral aberration charts of the catadioptric system of Embodiment 2.

FIG. 7 shows lateral aberrations of light of wavelengths of the C-line (656.3 nm), the d-line (587.6 nm), the F-line (486.1 nm) and the g-line (435.8 nm) at an axial object height (Y=0 mm) and a maximum object height (Y=7.2 mm). The aberrations are sufficiently suppressed.

Figure 8:
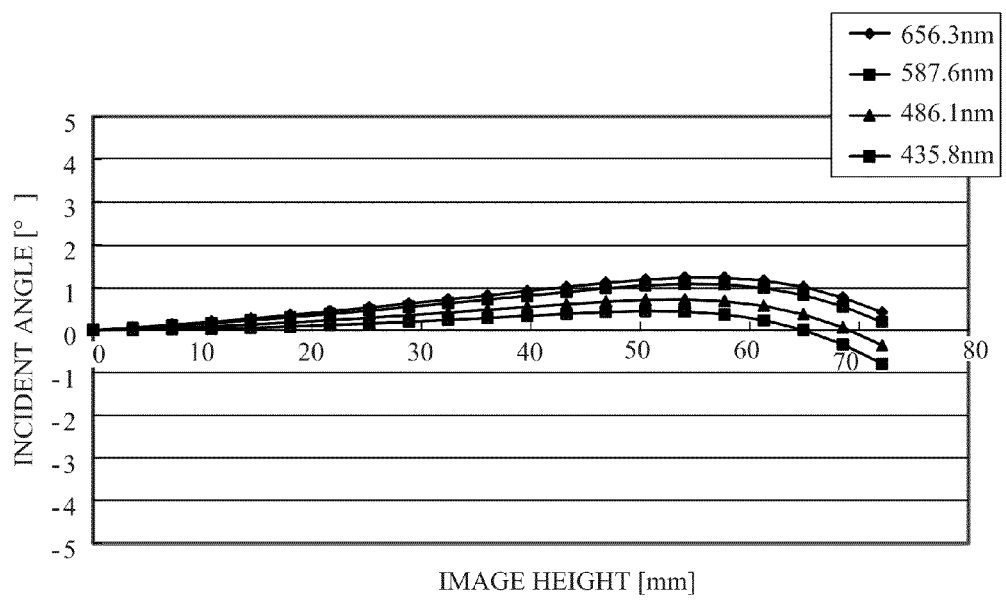
FIG. 8 shows incident angles of principal rays to respective image heights in the catadioptric system of Embodiment 2.

FIG. 8 shows incident angles of principal rays to respective image heights. The figure shows that the use of the aspheric surfaces each having the inflexion point generates inflection points of the incident angles of the principal rays according to the image height. The incident angles of the principal rays of the C-line (656.3 nm), the d-line (587.6 nm), the F-line (486.1 nm) and the g-line (435.8 nm) to the respective image heights on the image surface (image sensor 105) are 1.25° or less.

Although the above description has been made of the image pickup apparatus, alternative embodiments of the present invention include microscope apparatuses scanning or not scanning a wide screen.

Numerical values of Numerical Examples 1 and are shown below. Surface numbers show order of optical surfaces counted from the object surface (specimen surface) OBJ toward the image surface IS. Symbol r represents a curvature radius of an i-th optical surface. Symbol d represents a distance between the i-th optical surface and an (i+1)-th optical surface, which is shown with a positive sign when being measured from the object side toward the image side (that is, in a direction in which light travels) and with a negative sign in its reverse direction. Symbols Nd and νd respectively represent a refractive index and an Abbe number of a material of a lens having the i-th optical surface for a wavelength of 587.6 nm.

The aspheric shape is shown by the following general aspheric expression (9). In the following expression, symbol Z represents a coordinate in the optical axis direction, symbol c represents a curvature (inverse of a curvature radius), symbol h represents a height from the optical axis, symbol k represents a conic coefficient, and symbols A, B, C, D, E, F, G, H and J respectively represent 4th-, 6th-, 8th-, 10th-, 12th-, 14th-, 16th-, 18th- and 20th-order aspheric coefficients. "E-X" means "×10$^{-X}$"

$$Z = \frac{ch^2}{1 + \sqrt{(1+k)\,c^2 h^2}} + Ah^4 + Bh^6 + Ch^8 + Dh^{10} + Eh^{12} + Fh^{14} + Gh^{16} + Hh^{18} + Jh^{20} + \ldots \quad (9)$$

Table 1 shows relationships of the above-described conditions and Embodiments (Numerical Examples) 1 and 2.

NUMERICAL EXAMPLES 1

| 25th surface D/Ymax = 0.094 | | | | |
|---|---|---|---|---|
| Surface No. | r | d | Nd | vd |
| OBJ |  | 5.00 |  |  |
| 1 | 571.78 | 9.37 | 1.52 | 64.1 |
| 2 | −3609.25 | 72.99 |  |  |
| 3 | −85.68 | 7.36 | 1.52 | 64.1 |
| 4 | −116.17 | −7.36 | 1.52 | 64.1 |
| 5 | −85.68 | −72.99 |  |  |
| 6 (AS) | 1E+18 | 0.00 |  |  |
| 7 | −3609.25 | −9.37 | 1.52 | 64.1 |
| 8 | 571.78 | 9.37 | 1.52 | 64.1 |
| 9 | −3609.25 | 72.99 |  |  |
| 10 | −85.68 | 7.36 | 1.52 | 64.1 |
| 11 | −116.17 | 3.00 |  |  |
| 12 | −1000.00 | 7.73 | 1.62 | 63.3 |
| 13 | −23.79 | 5.00 | 1.74 | 32.3 |
| 14 | −69.26 | 0.85 |  |  |
| 15 | 80.29 | 8.75 | 1.62 | 63.3 |
| 16 | −46.84 | 8.35 |  |  |
| 17 | 34.98 | 9.47 | 1.49 | 70.2 |
| 18 | 267.47 | 5.12 |  |  |
| 19 | 102.43 | 8.85 | 1.75 | 35.3 |
| 20 | −57.48 | 5.47 |  |  |
| 21 | −28.65 | 5.00 | 1.62 | 36.3 |
| 22 | −1302.77 | 3.22 |  |  |
| 23 (SH) | 1E+18 | 13.06 |  |  |
| 24 | 94.22 | 9.74 | 1.49 | 70.2 |
| 25 | 872.06 | 0.89 |  |  |
| 26 | 92.02 | 13.97 | 1.76 | 47.8 |
| 27 | −73.69 | 0.50 |  |  |
| 28 | 50.23 | 10.91 | 1.59 | 61.1 |
| 29 | 150.52 | 6.60 |  |  |
| 30 | 67.98 | 5.26 | 1.76 | 27.5 |
| 31 | 48.23 | 17.23 |  |  |
| 32 | −28.97 | 5.00 | 1.74 | 44.8 |
| 33 | 384.10 | 20.72 |  |  |
| 34 | −39.10 | 5.00 | 1.52 | 64.1 |
| 35 | −1000.00 | 14.34 |  |  |
| 36 | −109.29 | 17.24 | 1.74 | 44.8 |
| 37 | −66.98 | 1.49 |  |  |
| 38 | −124.39 | 20.68 | 1.76 | 40.1 |
| 39 | −77.76 | 0.50 |  |  |
| 40 | 1280.43 | 25.87 | 1.65 | 58.6 |
| 41 | −245.91 | 1.50 |  |  |
| 42 | 1E+18 | 6.00 | 1.52 | 64.1 |
| 43 | 1E+18 | 3.00 |  |  |
| IP |  | 0.00 |  |  |

| (Aspheric Coefficients) | | | | |
|---|---|---|---|---|
| Surface No. | k | A | B | C | D |
|  | E | F | G | H | J |
| 1, 8 | 0.00E+00 | 2.17E−08 | −7.88E−13 | 2.62E−16 | 5.08E−20 |
|  | −2.24E−23 | 4.77E−27 | −3.83E−31 | 0.00E+00 | 0.00E+00 |
| 4, 11 | 0.00E+00 | 1.56E−08 | 1.48E−12 | 1.13E−16 | 4.86E−21 |
|  | 1.53E−24 | −1.25E−28 | 1.61E−32 | 0.00E+00 | 0.00E+00 |
| 12 | 0.00E+00 | −1.04E−05 | 1.68E−09 | 3.91E−11 | −3.86E−14 |
|  | −4.16E−27 | −1.57E−32 | 0.00E+00 | 0.00E+00 | 0.00E+00 |
| 15 | 0.00E+00 | 4.27E−07 | −7.79E−09 | 7.28E−12 | −9.88E−15 |
|  | −1.57E−23 | −2.12E−27 | 0.00E+00 | 0.00E+00 | 0.00E+00 |

-continued

| | | 25th surface D/Ymax = 0.094 | | | |
|---|---|---|---|---|---|
| 20 | 0.00E+00 | 1.26E−07 | −3.21E−10 | 5.01E−12 | −4.04E−15 |
| | −1.25E−17 | 0.00E+00 | 0.00E+00 | 0.00E+00 | 0.00E+00 |
| 22 | 0.00E+00 | −5.74E−06 | 2.86E−09 | −3.91E−12 | 5.85E−16 |
| | 1.86E−17 | −9.75E−30 | 0.00E+00 | 0.00E+00 | 0.00E+00 |
| 25 | 0.00E+00 | −2.09E−06 | 2.02E−10 | −1.30E−12 | 1.82E−15 |
| | −1.11E−18 | 2.55E−22 | 0.00E+00 | 0.00E+00 | 0.00E+00 |
| 27 | 0.00E+00 | 2.61E−06 | −4.12E−10 | 9.80E−13 | −1.30E−15 |
| | 7.96E−19 | −1.85E−22 | 0.00E+00 | 0.00E+00 | 0.00E+00 |
| 30 | 0.00E+00 | −1.97E−06 | −4.26E−09 | 2.40E−12 | −3.70E−15 |
| | 5.74E−18 | −6.57E−22 | 0.00E+00 | 0.00E+00 | 0.00E+00 |
| 33 | 0.00E+00 | 5.69E−06 | −7.34E−09 | −4.87E−13 | 7.08E−15 |
| | −3.50E−18 | −5.33E−22 | 0.00E+00 | 0.00E+00 | 0.00E+00 |
| 34 | 0.00E+00 | 7.38E−06 | −7.97E−10 | 8.25E−13 | −3.34E−16 |
| | −2.99E−19 | 4.52E−22 | 0.00E+00 | 0.00E+00 | 0.00E+00 |
| 37 | 0.00E+00 | 8.79E−07 | −1.20E−10 | 5.06E−15 | 1.55E−17 |
| | −3.82E−21 | −3.04E−25 | 1.63E−28 | 0.00E+00 | 0.00E+00 |
| 41 | 0.00E+00 | −5.21E−07 | 1.54E−10 | −2.03E−14 | −3.00E−18 |
| | 1.39E−21 | −1.77E−25 | 7.97E−30 | 0.00E+00 | 0.00E+00 |

NUMERICAL EXAMPLES 2

| | 25th surface D/Ymax = 0.091 | | | |
|---|---|---|---|---|
| | 40th surface D/Ymax = 0.983 | | | |
| Surface No. | r | d | Nd | νd |
| OBJ | | 5.00 | | |
| 1 | 571.28 | 9.37 | 1.52 | 64.1 |
| 2 | −3624.52 | 73.00 | | |
| 3 | −85.68 | 7.36 | 1.52 | 64.1 |
| 4 | −116.18 | −7.36 | 1.52 | 64.1 |
| 5 | −85.68 | −73.00 | | |
| 6 (AS) | 1E+18 | 0.00 | | |
| 7 | −3624.52 | −9.37 | 1.52 | 64.1 |
| 8 | 571.28 | 9.37 | 1.52 | 64.1 |
| 9 | −3624.52 | 73.00 | | |
| 10 | −85.68 | 7.36 | 1.52 | 64.1 |
| 11 | −116.18 | 3.00 | | |
| 12 | −1000.00 | 7.81 | 1.62 | 63.3 |
| 13 | −23.24 | 5.00 | 1.74 | 32.3 |
| 14 | −66.37 | 0.76 | | |
| 15 | 86.02 | 8.67 | 1.62 | 63.3 |
| 16 | −46.96 | 8.24 | | |
| 17 | 35.14 | 9.46 | 1.49 | 70.2 |
| 18 | 280.47 | 5.06 | | |
| 19 | 101.70 | 8.86 | 1.75 | 35.3 |
| 20 | −57.96 | 5.54 | | |
| 21 | −28.41 | 5.00 | 1.62 | 36.3 |
| 22 | −751.65 | 3.40 | | |
| 23 (SH) | 1E+18 | 12.84 | | |
| 24 | 95.92 | 9.42 | 1.49 | 70.2 |
| 25 | 852.71 | 0.89 | | |
| 26 | 91.77 | 13.97 | 1.76 | 47.8 |
| 27 | −72.77 | 0.50 | | |
| 28 | 50.79 | 10.92 | 1.59 | 61.1 |
| 29 | 161.60 | 6.40 | | |
| 30 | 68.79 | 5.74 | 1.76 | 27.5 |
| 31 | 48.05 | 16.95 | | |
| 32 | −29.09 | 5.00 | 1.74 | 44.8 |
| 33 | 300.45 | 21.12 | | |
| 34 | −39.73 | 5.00 | 1.52 | 64.1 |
| 35 | −948.08 | 12.82 | | |
| 36 | −109.93 | 20.73 | 1.74 | 44.8 |
| 37 | −67.62 | 0.50 | | |
| 38 | −176.16 | 21.27 | 1.76 | 40.1 |
| 39 | −88.89 | 0.50 | | |
| 40 | −792.06 | 24.44 | 1.65 | 58.6 |
| 41 | −163.16 | 1.50 | | |
| 42 | 1E+18 | 6.00 | 1.52 | 64.1 |
| 43 | 1E+18 | 3.00 | | |
| IP | | 0.00 | | |

-continued

| 25th surface D/Ymax = 0.091 |
| 40th surface D/Ymax = 0.983 |

(Aspheric Coefficients)

| Surface No. | k / E | A / F | B / G | C / H | D / J |
|---|---|---|---|---|---|
| 1, 8 | 0.00E+00 | 2.16E−08 | −8.49E−13 | 2.74E−16 | 5.07E−20 |
|  | −2.32E−23 | 4.99E−27 | −4.03E−31 | 0.00E+00 | 0.00E+00 |
| 4, 11 | 0.00E+00 | 1.56E−08 | 1.47E−12 | 1.13E−16 | 4.58E−21 |
|  | 1.56E−24 | −1.28E−28 | 1.61E−32 | 0.00E+00 | 0.00E+00 |
| 12 | 0.00E+00 | −1.12E−05 | 2.13E−09 | 3.71E−11 | −2.65E−14 |
|  | −4.66E−26 | −1.57E−32 | 0.00E+00 | 0.00E+00 | 0.00E+00 |
| 15 | 0.00E+00 | 1.05E−06 | −8.18E−09 | 6.20E−12 | −7.12E−15 |
|  | −4.36E−23 | −2.12E−27 | 0.00E+00 | 0.00E+00 | 0.00E+00 |
| 20 | 0.00E+00 | 6.84E−08 | −3.73E−10 | 4.60E−12 | −2.87E−15 |
|  | −1.46E−17 | 0.00E+00 | 0.00E+00 | 0.00E+00 | 0.00E+00 |
| 22 | 0.00E+00 | −5.87E−06 | 3.01E−09 | −4.24E−12 | 1.24E−15 |
|  | 1.86E−17 | −9.75E−30 | 0.00E+00 | 0.00E+00 | 0.00E+00 |
| 25 | 0.00E+00 | −1.99E−06 | 1.58E−10 | −1.27E−12 | 1.75E−15 |
|  | −1.08E−18 | 2.55E−22 | 0.00E+00 | 0.00E+00 | 0.00E+00 |
| 27 | 0.00E+00 | 2.63E−06 | −4.61E−10 | 1.01E−12 | −1.29E−15 |
|  | 7.90E−19 | −1.85E−22 | 0.00E+00 | 0.00E+00 | 0.00E+00 |
| 30 | 0.00E+00 | −1.85E−06 | −4.28E−09 | 2.45E−12 | −3.90E−15 |
|  | 5.63E−18 | −6.57E−22 | 0.00E+00 | 0.00E+00 | 0.00E+00 |
| 33 | 0.00E+00 | 5.65E−06 | −7.38E−09 | −3.22E−13 | 6.67E−15 |
|  | −3.21E−18 | −5.33E−22 | 0.00E+00 | 0.00E+00 | 0.00E+00 |
| 34 | 0.00E+00 | 6.98E−06 | −7.41E−10 | 9.01E−13 | −2.78E−16 |
|  | −4.35E−19 | 4.52E−22 | 0.00E+00 | 0.00E+00 | 0.00E+00 |
| 37 | 0.00E+00 | 1.11E−06 | −2.82E−10 | 4.93E−14 | 1.25E−17 |
|  | −4.23E−21 | −3.04E−25 | 1.63E−28 | 0.00E+00 | 0.00E+00 |
| 40 | 0.00E+00 | 4.43E−07 | −1.41E−10 | 1.83E−14 | 3.08E−18 |
|  | −1.38E−21 | 1.76E−25 | −7.94E−30 | 0.00E+00 | 0.00E+00 |

TABLE 1

| Condition | Parameters | Embodiment 1 | Embodiment 2 |
|---|---|---|---|
|  | f1 | 67.678 | 67.692 |
|  | f2 | 321.087 | −65619.355 |
|  | β | 10.00 | 10.00 |
|  | f21 | 24.720 | 24.770 |
|  | f22 | 35.132 | 34.897 |
|  | f23 | −36.020 | −35.416 |
|  | f24 | 148.006 | 132.226 |
|  | D | L7 (R2) | L7 (R2) |
|  |  |  | L15 (R1) |
|  | Ymax | 72 (mm) | 72 (mm) |
| (1) | D/Ymax | L7 0.094 | L7 0.091 |
|  |  |  | L15 0.983 |
| (2) | \|f1/f2\| | 0.211 | 0.001 |
| (3) | \|β1\| | −1.516 | −1.515 |
| (4) | \|β2\| | −6.598 | −6.601 |
| (5) | \|f21/f2\| | 0.077 | 0.0004 |
| (6) | \|f22/f2\| | 0.109 | 0.0005 |
| (7) | \|f23/f2\| | 0.112 | 0.0005 |
| (8) | \|f24/f2\| | 0.461 | 0.0020 |

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures and functions.

This application claims the benefit of Japanese Patent Application No. 2011-171654, filed on Aug. 5, 2011 which is hereby incorporated by reference herein in its entirety.

What is claimed is:

1. A catadioptric system comprising:
   a first imaging optical system configured to collect a light flux from an object to form an intermediate image of the object; and
   a second imaging optical system configured to cause the light flux from the intermediate image to form an optical image,
   wherein the first imaging optical system comprises:
      a first optical element including (a) a first light transmissive portion formed on and around an optical axis and (b) a first back reflective portion formed as an object side surface in a more outer peripheral side portion than the first light transmissive portion; and
      a second optical element including (c) a second light transmissive portion formed on and around the optical axis and (d) a second back reflective portion formed as an image side surface in a more outer peripheral side portion than the second light transmissive portion,
   wherein the light flux from the object enters the second imaging optical system successively through the first light transmissive portion, the second back reflective portion, the first back reflective portion and the second light transmissive portion,
   wherein the second imaging optical system includes an aspheric lens surface having an inflexion point at which a direction of a curvature thereof changes, and
   wherein the following condition is satisfied:

$0.09 < D/Y\text{max} < 1.01$, where D represents a distance from an optical axis to an outermost off-axis principal ray in the aspheric lens surface and Ymax represents a highest image height on an image plane.

2. A catadioptric system according to claim 1, wherein the following condition is satisfied:

$0.00 \leq |f1/f2| < 0.25$, where f1 represents a focal length of the first imaging optical system and f2 represents a focal length of the second imaging optical system.

3. A catadioptric system according to claim 1, wherein the following conditions are satisfied:

$1.3<|\beta 1|<1.7$; and $6.2<|\beta 2|<6.9$, where β1 represents an imaging magnification of the first imaging optical system and β2 represents an imaging magnification of the second imaging optical system.

4. A catadioptric system according to claim 1, wherein the aspheric lens surface has a negative refractive power on and around the optical axis and a positive refractive power in a peripheral portion thereof.

5. A catadioptric system comprising:
a first imaging optical system configured to collect a light flux from an object to form an intermediate image of the object; and
a second imaging optical system configured to cause the light flux from the intermediate image to form an optical image,
wherein the first imaging optical system comprises:
a first optical element including (a) a first light transmissive portion formed on and around an optical axis and (b) a first back reflective portion formed as an object side surface in a more outer peripheral side portion than the first light transmissive portion; and
a second optical element including (c) a second light transmissive portion formed on and around the optical axis and (d) a second back reflective portion formed as an image side surface in a more outer peripheral side portion than the second light transmissive portion,
wherein the light flux from the object enters the second imaging optical system successively through the first light transmissive portion, the second back reflective portion, the first back reflective portion and the second light transmissive portion,
wherein the second imaging optical system includes an aspheric lens surface having an inflexion point at which a direction of a curvature thereof changes,
wherein the second imaging optical system includes, in order from an object side toward an image side, a first lens group, a second lens group, a third lens group and a fourth lens group that are separated with a first-widest aerial distance, a second-widest aerial distance, and a third-widest aerial distance thereamong, and
wherein the following conditions are satisfied:

$0.00 \leq |f21/f2|<0.10$;

$0.00 \leq |f22/f2|<0.12$;

$0.00 \leq |f23/f2|<0.13$; and $0.00 \leq |f24/f2|<0.50$, where f2 represents a focal length of the second imaging optical system, f21 represents a focal length of the first lens group, f22 represents a focal length of the second lens group, f23 represents a focal length of the third lens group, and f24 represents a focal length of the fourth lens group.

6. An image pickup apparatus comprising:
a light source;
an illumination optical system to illuminate an object with a light flux from the light source;
a catadioptric system to cause the light flux from the object to form an optical image of the object;
an image sensor to photoelectrically convert the optical image; and
an image processing system to produce image information by using data from the image sensor,
wherein the catadioptric system comprises:
a first imaging optical system configured to collect the light flux from the object to form an intermediate image of the object; and
a second imaging optical system configured to cause the light flux from the intermediate image to form an optical image of the intermediate image,
wherein the first imaging optical system comprises:
a first optical element including (a) a first light transmissive portion formed on and around an optical axis and (b) a first back reflective portion formed as an object side surface in a more outer peripheral side portion than the first light transmissive portion; and
a second optical element including (c) a second light transmissive portion formed on and around the optical axis and (d) a second back reflective portion formed as an image side surface in a more outer peripheral side portion than the second light transmissive portion,
wherein the light flux from the object enters the second imaging optical system successively through the first light transmissive portion, the second back reflective portion, the first back reflective portion and the second light transmissive portion,
wherein the second imaging optical system includes an aspheric lens surface having an inflexion point at which a direction of a curvature thereof changes, and
wherein the following condition is satisfied:

$0.09<D/Y\max<1.01$, where D represents a distance from an optical axis to an outermost off-axis principal ray in the aspheric lens surface and Ymax represents a highest image height on the image sensor.

7. An image pickup apparatus according to claim 6, wherein a plurality of the image sensors are disposed on an imaging surface of the catadioptric system.

8. An image pickup apparatus according to claim 6, wherein the aspheric lens surface has a negative refractive power on and around the optical axis and a positive refractive power in a peripheral portion thereof.

9. An image pickup apparatus according to claim 6, wherein the second imaging optical system includes, in order from an object side toward an image side, a first lens group, a second lens group, a third lens group, and a fourth lens group that are separated with a first-widest aerial distance, a second-widest aerial distance, and a third-widest aerial distance thereamong, and
wherein the following conditions are satisfied:

$0.00 \leq |f21/f2|<0.10$;

$0.00 \leq |f22/f2|<0.12$;

$0.00 \leq |f23/f2|<0.13$; and $0.00 \leq |f24/f2|<0.50$, where f2 represents a focal length of the second imaging optical system, f21 represents a focal length of the first lens group, f22 represents a focal length of the second lens group, f23 represents a focal length of the third lens group, and f24 represents a focal length of the fourth lens group.

* * * * *